H. J. DEW.
LAMP FOR MOTOR VEHICLES AND LIKE SERVICES.
APPLICATION FILED MAR. 15, 1916.

1,217,718.  Patented Feb. 27, 1917.

Inventor:
Henry J. Dew,
by Spear, Middleton, Donaldson & Spear
Atty's.

UNITED STATES PATENT OFFICE.

HENRY JOSEPH DEW, OF CHORLTON-CUM-HARDY, MANCHESTER, ENGLAND.

LAMP FOR MOTOR-VEHICLES AND LIKE SERVICES.

1,217,718.　　　　　　　Specification of Letters Patent.　　Patented Feb. 27, 1917.

Application filed March 15, 1916.　Serial No. 84,382.

*To all whom it may concern:*

Be it known that I, HENRY JOSEPH DEW, a subject of the King of Great Britain and Ireland, and resident of 51 High Lane, Chorlton-cum-Hardy, Manchester, in the county of Lancaster, England, have invented certain new and useful Improvements in Lamps for Motor-Vehicles and like Services.

This invention relates to acetylene and like lamps of motor and other vehicles, and has for its objects to provide an improved arrangement of the burner fitting which shall allow of more ready and convenient access being obtained to the burner for examination or other purposes and to combine with said fitting a lamp rest which effectually supports the lamp and obviates any liability of fracture of the lamp case due to the great vibration to which it is subjected when used on commercial and like vehicles.

My invention comprises the formation of the burner fitting as an independent self-supporting element with the burner projecting through an aperture in the lamp, so that the lamp can be removed from around the burner without interfering with the latter in any way. My invention further comprises the provision of a cradle-like member in which the burner is mounted, of a form corresponding to the contour of the lower portion of the lamp so that the latter can rest in or upon said cradle and be effectually supported thereby, the securing means merely serving to hold the lamp in position in the cradle.

Referring to the accompanying sheet of explanatory drawings:—

The same reference letters in the two views indicate the same parts.

Figure 1:
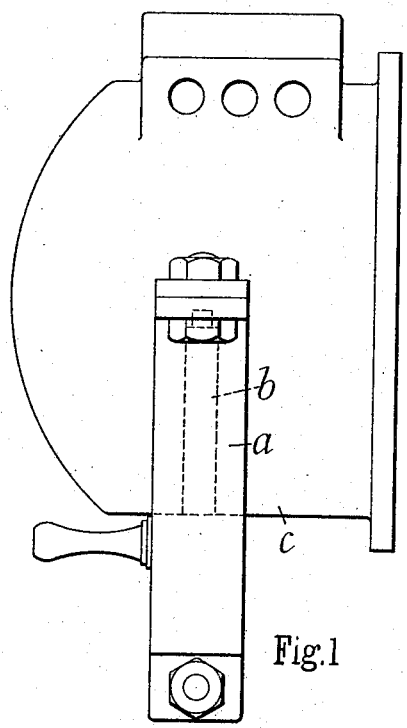
Figure 1 is a side elevation of a lamp mounted upon the burner fitting in accordance with my invention.
Figure 2:
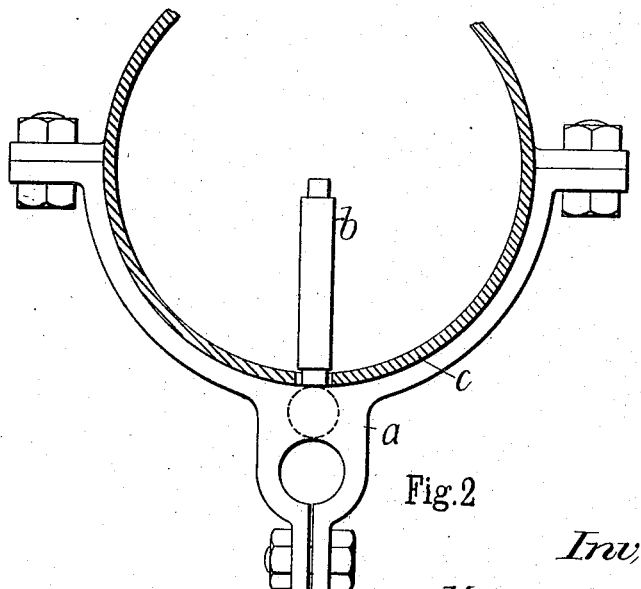
Fig. 2 is a front elevation of the burner fitting with part of the lamp body therein in section.

In the illustrated application of my invention, the burner fitting is made as an independent element *a* mounted upon a convenient part of the motor or other vehicle, the burner *b* projecting from said fitting into the lamp through an aperture in the body *c* of the same. The lamp may be supported in any convenient manner, but I preferably make the burner fitting part of a cradle-like member of practically semi-circular form, as shown, in which the lamp rests, the lamp being secured to the cradle in any ordinary manner as by lugs. With the aforesaid arrangement, the lamp is supported around its lower side, thereby obviating damage due to vibration, for the lugs serve merely as securing and not supporting means.

By the employment of my invention, examination or replacement of the burner is greatly facilitated.

Having now described my invention what I claim as new and desire to secure by Letters Patent is:—

1. In lamps for motor vehicles and like services, the combination with the lamp of a self-contained self-supporting burner fitting disposed beneath the lamp, a burner projecting upwardly from said fitting and passing freely into the lamp, and means corresponding in internal form to the external contour of the lower portion of the lamp for supporting the lamp around said burner, as set forth.

2. In lamps for motor vehicles and like services, in combination, a self-contained self-supporting burner fitting disposed beneath the lamp, a gas inlet to and a burner outlet on said fitting, and lamp supporting means upon said fitting corresponding in internal form to the external contour of the lower portion of the lamp, as set forth.

3. In lamps for motor vehicles and like services, in combination, a self-contained self-supporting burner fitting, a gas inlet to and a burner outlet on said fitting, lamp supporting arms upon said fitting corresponding in internal form to the external contour of the lower portion of the lamp, a lamp resting in said supporting arms and having an aperture to pass over said burner, as set forth.

4. In lamps for motor vehicles and like services, in combination, a self-contained self-supporting burner fitting, a cradle-like lamp support formed integrally with said fitting, a lamp resting in said cradle, lugs upon the lamp and upon the cradle for securing the lamp in the cradle, and an aperture in the lamp to receive the burner, as set forth.

5. In lamps for motor vehicles and like services, in combination, a self-supporting burner fitting, a lamp fitting over the burner of said fitting, a cradle formed integrally with the fitting and corresponding in internal form to the external contour of the lower portion of the lamp, and means for securing the lamp in said cradle, as set forth.

In testimony whereof I have signed my name to this specification in the presence of two subscribing witnesses.

HENRY JOSEPH DEW.

Witnesses:
ARTHUR HUGHES,
HILDA HUGHES.

Copies of this patent may be obtained for five cents each, by addressing the "Commissioner of Patents, Washington, D. C."